P. BOUËRY.
CONTROLLER FOR NOZZLES.
APPLICATION FILED NOV. 22, 1915.

1,230,458.

Patented June 19, 1917.
3 SHEETS—SHEET 1.

WITNESSES:
Charles Pickles
Thos Castberg

INVENTOR
Pierre Bouëry.
BY Strong & Townsend
ATTORNEYS

P. BOUËRY.
CONTROLLER FOR NOZZLES.
APPLICATION FILED NOV. 22, 1915.
1,230,458.
Patented June 19, 1917.
3 SHEETS—SHEET 2.
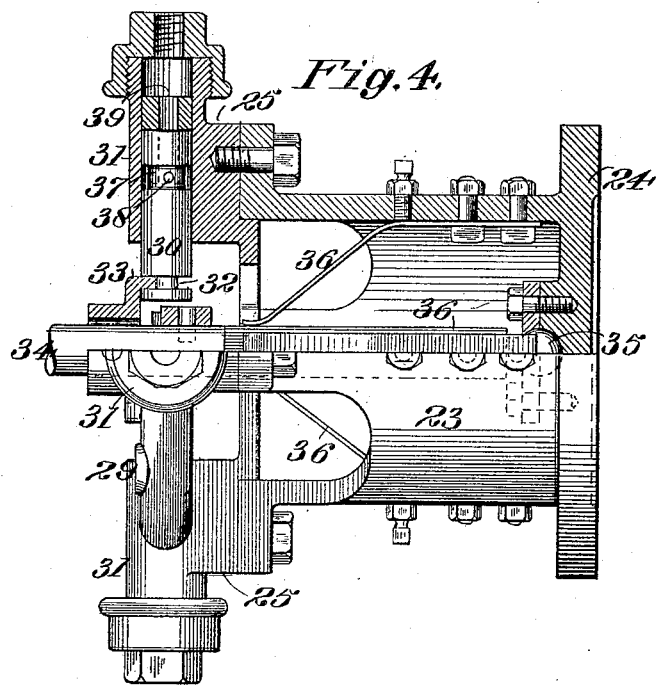
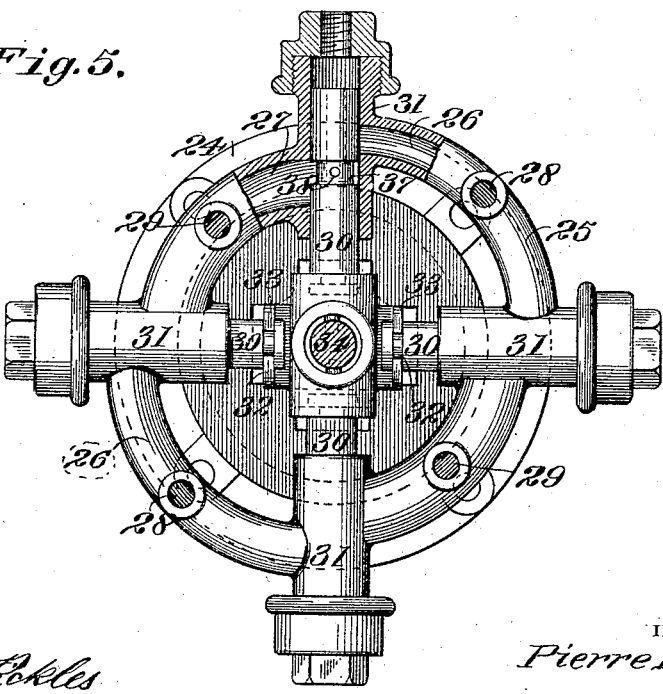
WITNESSES:
INVENTOR
Pierre Bouëry

P. BOUËRY.
CONTROLLER FOR NOZZLES.
APPLICATION FILED NOV. 22, 1915.

1,230,458.

Patented June 19, 1917.
3 SHEETS—SHEET 3.

WITNESSES:

INVENTOR
Pierre Bouëry

UNITED STATES PATENT OFFICE.

PIERRE BOUËRY, OF WEAVERVILLE, CALIFORNIA.

CONTROLLER FOR NOZZLES.

1,230,458.  Specification of Letters Patent.  Patented June 19, 1917.

Application filed November 22, 1915. Serial No. 62,910.

*To all whom it may concern:*

Be it known that I, PIERRE BOUËRY, a citizen of the United States, residing at Weaverville, in the county of Trinity and State of California, have invented new and useful Improvements in Controllers for Nozzles, of which the following is a specification.

This invention relates to controllers for nozzles, hydraulic giants, and the like; and has for its object to provide mechanically operated means for moving a nozzle angularly, which means is capable of being controlled from a point situated a long distance from the nozzle in a manner to vary the direction and length of movement of the nozzle.

In carrying out this object, I employ, in combination with a nozzle, a plurality of actuators therefor, each operated by a fluid pressure device, the latter controlled by means situated at a distant point from the nozzle and adapted to be manipulated by an attendant to cause movement of the desired actuator whereby to move the nozzle in any direction.

Two forms which my invention may assume are exemplified in the following description and illustrated in the accompanying drawings, in which—

Fig. 4 shows a side elevation, partly in section, of the controller for the fluid pressure devices.

Fig. 5 shows a circumferential view of the same.

Figure 1:
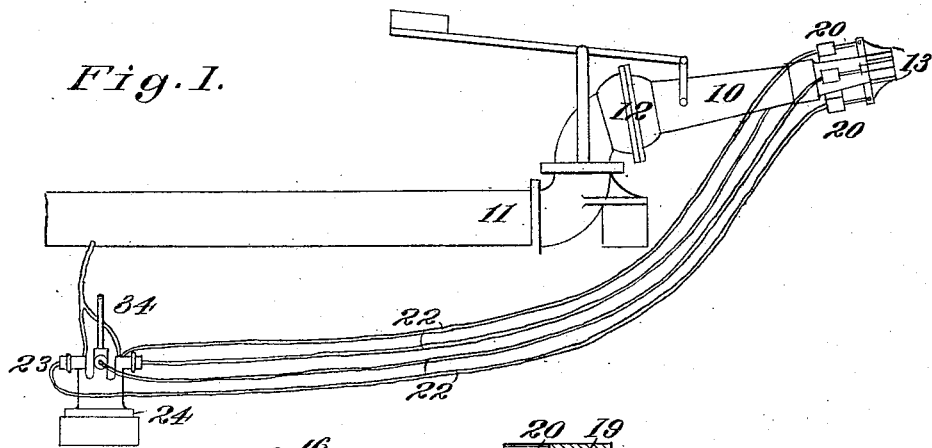
Figure 1 shows a side elevation of a hydraulic giant equipped with a device embodying my invention.
Figure 2:
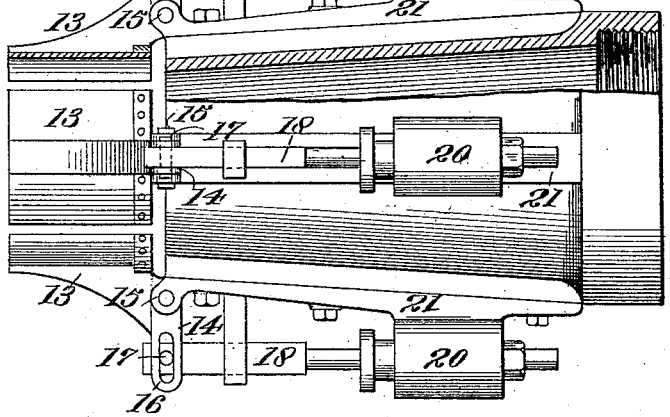
Fig. 2 shows a side elevation, partly in section, of the fluid pressure devices and actuators carried by the nozzle or giant.
Figure 3:
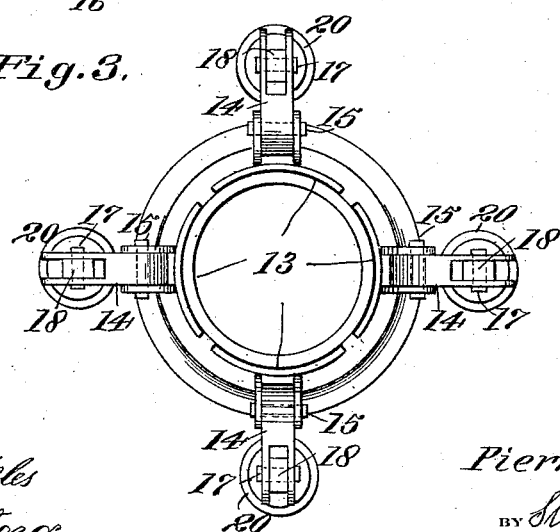
Fig. 3 shows a circumferential view, partly in section, of the parts illustrated in Fig. 2.

As will be understood, the usual nozzle or giant 10 is carried upon a hose or pipe 11 by means of a universal coupling 12. Referring now in detail to the showing made in Figs. 1 to 3 of the drawings, I have provided the end of the nozzle with four segmental actuators or deflectors 13, each with an angular extension 14 pivoted at 15 upon the nozzle. The outer end of each of the extensions 14 is provided with a slot 16 to receive a pin 17 carried by a link 18, which link connects with a piston 19 working in a cylinder 20; the whole being fixed upon the side of the nozzle by means of a detachable base-plate 21. Communicating with the interior of each of the cylinders 20 is a flexible pipe 22, running to a controller 23 located at any desired distance from the nozzle.

The controller embodies a casing fixed upon a support 24 and carrying an annular flange or head 25 at its outer end, within which flange are formed four segmental ducts or passageways, two of which (marked 26), diagonally disposed, are intake passageways, while the remaining pair (marked 27) are exhaust passageways. The former, through feeder pipes 28, communicate with any desired source of fluid pressure supply, and in the present case are shown as having communication with the main water supply receiving pressure therefrom. The latter named passageways, through exhaust pipes 29, are in communication with the air.

Between adjacent ends of the said passageways 26 and 27 are slidable valve stems 30, operating in radially disposed cylindrical casings 31, said cylinders being connected to and in communication with the flexible pipes 22 leading to the cylinders carried upon the nozzle. The inner ends of the slidable valve stem are formed with annular depressions 32, engaging with which are spaced fingers 33; all of said fingers being formed integrally and carried upon a controller handle 34 extending axially through the casing 23 and connected at its inner end thereto by means of a ball and socket joint 35, which permits universal movement of said handle. Leaf springs 36 are provided on the interior of the casing and act in four directions upon the controller handle, whereby to retain it in neutral position. Actuation of any one of the valve stems could be obtained by moving the controller handle in the direction of said stem, whereupon the valve stems perpendicular thereto will remain stationary by reason of a sliding connection between the same and the spaced fingers 33 carried upon the handle.

The valve stems are cylindrical in form and each has an intermediate depression 37, within which is a port 38 communicating with a central bore 39, the latter running to the outer end of the stem and opening into the tube or pipe 22 connected therewith. Normally, the depression 37 in each valve stem registers with the exhaust duct 27, but movement of the controller handle, in the desired direction, will cause the stem to be moved to a position where its depression will register with the intake passageway 26, thus putting the source of fluid pressure supply into direct communication with the desired cylinder and piston on the nozzle.

In operation, when any one of the valves embodied in the controller is opened to establish communication with the particular cylinder and piston connected therewith, the piston will be moved forwardly, thrusting the connected actuator inwardly against the stream of water issuing from the nozzle. The force and rigidity of the stream, particularly in hydraulic giants, striking against the segmental deflector or actuator will cause the nozzle to be moved on its universal connection in a direction toward the particular actuator operated. Thus any one of the actuators 13 may be operated by manipulation of the controller handle 34 to move the nozzle in right angular directions, while a diagonal movement of the controller handle will actuate two valve stems and open communication with the corresponding pair of cylinders on the nozzle, resulting in a 45° movement of the nozzle.

Figure 6:
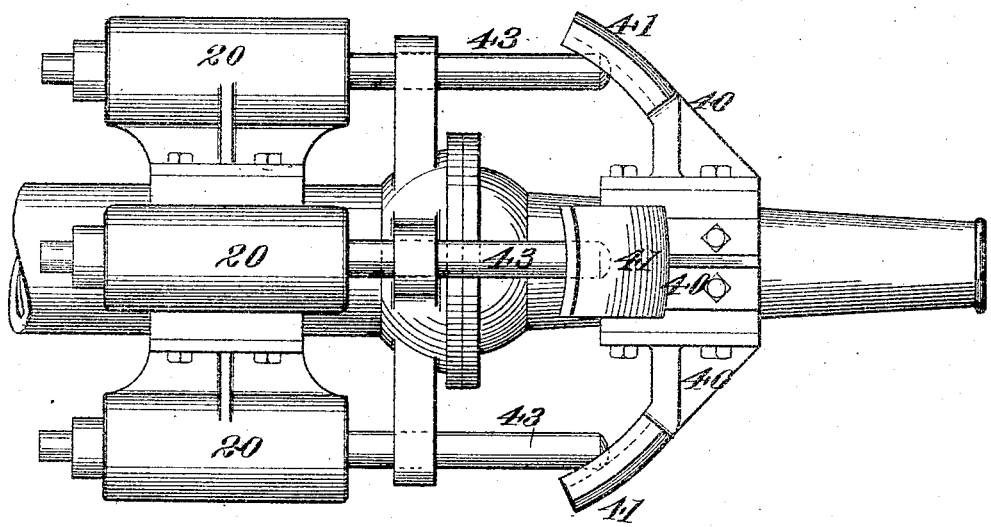
Fig. 6 shows a side elevation, partly in section, of a modification of the actuators employed in connection with the nozzle of a fire hose.
Figure 7:
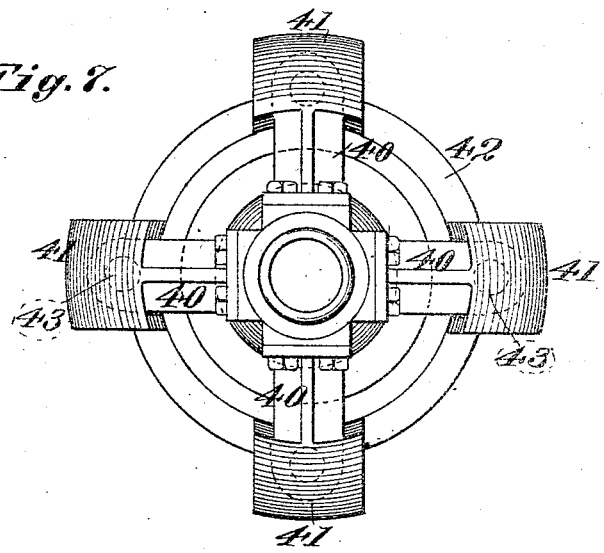
Fig. 7 shows an end view of the device illustrated in Fig. 6.

In Figs. 6 and 7 I show a modification of the actuators 13, in which the segmental plates or deflectors adapted to contact with a stream of water are dispensed with. The present modification is particularly suited for fire hose nozzles where the stream is of less force than in hydraulic giants. Here I mount upon the universally movable nozzle four actuators corresponding to those shown in the preceding form but each made up in the form of an arm 40 secured, rigidly, to the side of the nozzle and extending radially therefrom where it is provided, at its outer end, with a concave face plate 41. If desired, the four face plates 41 may be connected to each other by means of a ring 42, as shown in Fig. 7.

Bearing against each of the face plates 41 is a plunger rod 43 connected to a piston, as in the case of the links 18 in the other form. Here, however, the cylinders and pistons are shown as being mounted upon the stationary pipe or hose to the rear of the universal coupling, and relative movement between the rods 43 and face plates 41 is permitted on account of the shape of the latter. When one of the pistons in this form is moved outwardly the plunger rod thereon forces the nozzle in a direction away from its direction of movement, being just the reverse of the movement which takes place in the form of deflectors shown in Figs. 1 to 3.

In mining operations a plurality of the controllers 23 could be located side by side and attended to by one operator who would be out of the range of the spray.

In fire fighting apparatus a control could be arranged upon a truck which carries a vertically extending pipe line provided at its upper end with a movable nozzle. The operator in this case would be enabled to control the nozzle from a point of safety on the truck away from the heat and danger of the fire.

It is obvious that further changes and modifications in the construction and arrangement of the several parts of my device may be employed without departing from the spirit of my invention as disclosed in the appended claims.

Having thus described my invention, what I claim and desire to secure by Letters Patent is—

1. In combination, a nozzle mounted for universal movement, means for causing the nozzle to be deflected angularly in any direction, and hydraulic means for controlling the operation of said deflecting means.

2. In combination, a nozzle mounted for universal movement, means for causing the nozzle to be deflected angularly in any direction, and hydraulic means for controlling said deflecting means from a distant point to vary the direction and length of movement of the nozzle.

3. In combination, a nozzle, fluid pressure supply means for causing said nozzle to be moved angularly in intersecting planes, and means for controlling said pressure supply means to vary the direction of movement of the nozzle.

4. In combination, a hydraulic nozzle, means deflectable by the stream of water from the nozzle for causing the latter to be moved angularly, means operated by the water pressure from the supply main to control said deflectable means, and valves for controlling the supply of water to said pressure operated means.

5. A nozzle and a controller therefor, comprising actuators, fluid pressure supply means for operating said actuators to move the nozzle angularly in intersecting planes, and means for controlling the fluid pressure means to vary the direction of movement of the nozzle.

6. A nozzle and a controller therefor, comprising a plurality of actuators carried on the nozzle for moving the latter in different directions, a piston adjacent to each of said actuators for operating the same, fluid pressure supply means located at a distant point for operating said pistons, flexible conduits between said pistons and supply means, and means to control the admission of fluid to the pistons whereby to vary the direction of movement of the nozzle.

7. A controller for nozzles comprising a plurality of actuators, a piston for operating each of said actuators, fluid pressure supply means for operating the pistons whereby to move the nozzle angularly in different planes, and means operable from a distant point for controlling the admission of fluid to any one of said pistons whereby to vary the direction and length of movement of the nozzle.

8. A controller for nozzles comprising actuators arranged circumferentially about the nozzle, a piston for operating each of said actuators, fluid pressure means for operating the pistons to move the nozzle angularly, and means for controlling the admission of fluid to any one or more of said pistons whereby to cause movement of the nozzle in horizontal, vertical or diagonal direction.

9. A controller for nozzles comprising fluid pressure means for moving the nozzle angularly, means for controlling said pressure means to vary the direction of movement of the nozzle, said controlling means comprising a valve casing, an angularly movable handle disposed axially therein, and radially arranged valves carried in said casing and operable by said handle to open independently or in pairs.

10. A controller for nozzles comprising pivoted members carried on the end of said nozzle, segmental deflectors formed on said members and movable into the path of the stream issuing from said nozzle, and means for operating said pivoted members to project one or more of said deflectors into the path of the stream.

11. A controller for nozzles comprising pivoted members carried on the end of the nozzle, segmental shoes formed on said members and movable into the path of the stream issuing from the nozzle, pistons for operating said pivoted members, and fluid pressure supply means for operating said pistons.

In testimony whereof I have hereunto set my hand in the presence of two subscribing witnesses.

PIERRE BOUËRY.

Witnesses:
   JOHN H. HERRING,
   W. W. HEALY.

Copies of this patent may be obtained for five cents each, by addressing the "Commissioner of Patents, Washington, D. C."